(12) United States Patent
Carillo, Jr. et al.

(10) Patent No.: US 6,515,784 B2
(45) Date of Patent: Feb. 4, 2003

(54) REFRACTIVE INDEX MANIPULATING OPTICAL INVERTER

(75) Inventors: Juan C. Carillo, Jr., Torrance, CA (US); Bruce A. Ferguson, Redondo Beach, CA (US); Richard A. Fields, Redondo Beach, CA (US); Mark Kintis, Manhattan Beach, CA (US); Elizabeth T. Kunkee, Manhattan Beach, CA (US); Lawrence J. Lembo, Torrance, CA (US); Stephen R. Perkins, Harbor City, CA (US); David L. Rollins, Woodinville, WA (US); Eric L. Upton, Bellevue, WA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/840,858

(22) Filed: Apr. 24, 2001

(65) Prior Publication Data

US 2002/0167732 A1 Nov. 14, 2002

(51) Int. Cl.$^7$ .............................. G02F 1/03; H01S 3/00; H01J 40/14
(52) U.S. Cl. .............. 359/244; 359/349.1; 250/214 DC
(58) Field of Search .................... 250/214 DC; 359/244, 359/341.1, 344; 372/12

(56) References Cited

U.S. PATENT DOCUMENTS

| | | | | |
|---|---|---|---|---|
| 6,035,079 A | * | 3/2000 | Fields et al. | 385/19 |
| 6,121,907 A | * | 9/2000 | Fields et al. | 341/137 |
| 6,327,399 B1 | * | 12/2001 | Fields et al. | 385/19 |

* cited by examiner

*Primary Examiner*—Georgia Epps
*Assistant Examiner*—David N. Spector
(74) *Attorney, Agent, or Firm*—Harness, Dickey & Pierce, P.L.C.

(57) ABSTRACT

An optical inverting system employs a first optical structure having an index of refraction that varies with the intensity of an incident beam and a second optical structure having a constant index of refraction, and forming an interface therebetween. An optical pulse stream is combined with a laser beam and the combined beam is applied to the first optical structure, impinging the interface at a predetermined angle of incidence. If the angle of incidence is less than a critical angle, the beam is refracted into the second optical structure. If the angle of incidence is greater than the critical angle, the beam is completely reflected at the interface. Thus the output of the second optical structure is an inversion, and the output of the first optical structure is a level shifted replica, of the optical digital pulse stream.

19 Claims, 1 Drawing Sheet

REFRACTIVE INDEX MANIPULATING OPTICAL INVERTER

BACKGROUND OF THE INVENTION

1. Field of the Invention

This invention relates generally to an optical inverter and, more particularly, to an optical inverter that employs an intensity dependent optical inverting switch that includes a variable refractive index material at an optical interface.

2. Discussion of the Related Art

The art of digital logic systems consistently requires the need for greater processing speeds, increased channel bandwidths, and improved transmission reliability for information processing and transmission fields. Because of this continued need for improved system performance, the art is moving towards an increased focus on the optical domain. Digital logic systems typically incorporate a plurality of inverters. An inverter is a device which operates upon digital signals. These signals are composed of pulses having either a "high" state or a "low" state. The inverter produces a low output for a high input, and a high output for a low input. The output signal thus contains no more or less information than the input, and is merely a reversal of the pulse state. In an optical system, a logical "high" might be represented by the presence of a light pulse at a specific time in an optical waveguide, and a logical "low" might be represented by the absence of a light pulse at a specific time in the waveguide. The opposite representation is also possible, where the presence of light indicates a "low" and the absence of light indicates a "high." The mapping is arbitrary as long as it is consistent with the system in which the inverter is to be used.

Inverters are important in digital systems for many reasons, such as the application of Demorgan's theorem. Demorgan's theorem allows the combination of only AND gates and inverters, or the combination of only OR gates and inverters, to form a complete gate set. Also, optical inverters are a vital component of optical analog-to-digital (A/D) converters.

FIG. 1 shows a representation of an optical inverter 10 suitable for a typical optical digital logic application. The optical inverter 10 receives an optical input beam of a predetermined intensity on an input fiberoptic cable 12, or some other suitable optical waveguide medium, and outputs an optical output beam on an output fiberoptic cable 14, or some other suitable optical waveguide medium. The optical inverter 10 acts as an inverter in that when the optical input beam on the cable 12 is applied to the optical inverter 10, the optical output beam on the cable 14 is dark, or at a predetermined low optical intensity level, and represents a logical zero. Likewise, when the optical input beam on the cable 12 is off, or at a low optical intensity level, a predetermined intensity optical output beam is provided on the output cable 14, and represents a logical one. Thus, the optical output beam of the optical inverter 10 will be a high or low intensity optical output beam, depending on the optical input beam.

Various types of optical inverters are known in the art. One known optical inverter is referred to as a semiconductor optical amplifier (SOA) inverter. The SOA inverter is a saturable optical amplifier that includes a first optical input having a first wavelength, a second optical input having a second wavelength and an optical output that is a combination of the first and second inputs. The first input goes high and low as a digital high and a digital low, and the output conversely goes low and high as an inversion of the first input. The second input is maintained high. When the first input is low or zero, the output is simply the second input, thus representing a high state or logical one. When the first input goes high, the intensity of this first input is designed high enough to saturate the SOA, significantly reducing its gain for both wavelengths. As a result, the amount of light intensity in the output from the second input is reduced. The output beam is then passed through a filter which removes the wavelength of the first input leaving only the second input. This filtered output will then appear to go down when the first input goes high and come back up again when the first input goes low.

Because the main use of the SOA is a wavelength conversion device for use in wavelength division multiplexing technology, it is limited in its ability to be used as an inverter. Further, the SOA is an active device that is fairly complex and is generally not efficient as an optical inverter. What is needed is an optical inverter that is simpler and more effective than the optical inverters known in the art.

U.S. patent application Ser. No. 09/133,032, filed Aug. 11, 1998, titled "Saturable Absorber Based Optical Inverter," now U.S. Pat. No. 6,035,079 and assigned to the assignee of the instant application, discloses an optical inverter that employs a saturable absorber to distinguish between a logical one and a logical zero. A laser generates an optical beam that is split into a first beam that propagates along a first beam path and a second beam that propagates along a second beam path. The first beam and the second beam are then recombined as an optical output beam by an optical combiner. The first beam path and the second beam path have a length relative to each other such that the first and second beams are 180° out of phase when they reach the optical combiner. The saturable absorber acts as an optical switch, and is positioned in the first beam path. The saturable absorber receives an optical input signal that causes the absorber to saturate and switch from an opaque mode to a transparent mode to allow the first beam to pass through the absorber. Therefore, if the saturable absorber is switched to the transparent mode, the first and second beams combine destructively and the optical output beam is dark, or a logical zero. When the optical input signal is not applied to the saturable absorber, the absorber is in the opaque mode, and the first beam is blocked so that the optical output beam is the second beam, providing a logical one.

Although the saturable absorber optical inverter has been used for inverting an optical beam, an optical inverter employing different optical inversion schemes may be better suited for different applications. It is therefore an objective of the present invention to provide an optical inverter.

SUMMARY OF THE INVENTION

In accordance with the teachings of the present invention, an optical inverting system is disclosed that employs an intensity dependent optical inverting switch. The inverting switch includes a first optical structure having an index of refraction that varies with the intensity of an incident beam and a second optical structure having a substantially constant index of refraction forming an interface therebetween. An optical digital pulse stream to be inverted is combined with a continuous laser beam, and the combined beam is applied to the first optical structure. The combined beam enters the first optical structure, effecting its index of refraction, and impinges the interface at a predetermined angle of incidence. If the angle of incidence is less than the critical angle defined by Snell's Law at the interface, most of the combined beam is refracted into the second optical structure through the interface, and exits the second optical structure as an inversion of the optical digital pulse stream. Part of the combined beam is also reflected off of the interface. If the angle of incidence is greater than the critical angle, the combined beam is completely reflected off of the interface, and exits the first optical structure as a scaled version of the optical digital pulse stream.

Additional objectives, advantages and features of the present invention will become apparent from the following description and appended claims, taken in conjunction with the accompanying drawings.

DETAILED DESCRIPTION OF THE PREFERRED EMBODIMENTS

The following description of the preferred embodiments directed to an optical inverter employing an intensity dependent optical inverting switch having a variable refractive index material at an optical interface is merely exemplary in nature, and is in no way intended to limit the invention or its applications or uses.

Figure 1:
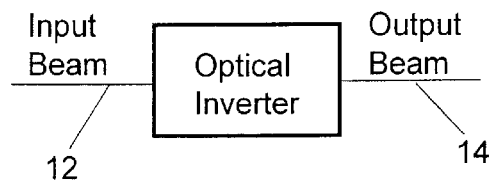
FIG. 1 is a representation of an optical inverter.
Figure 2:
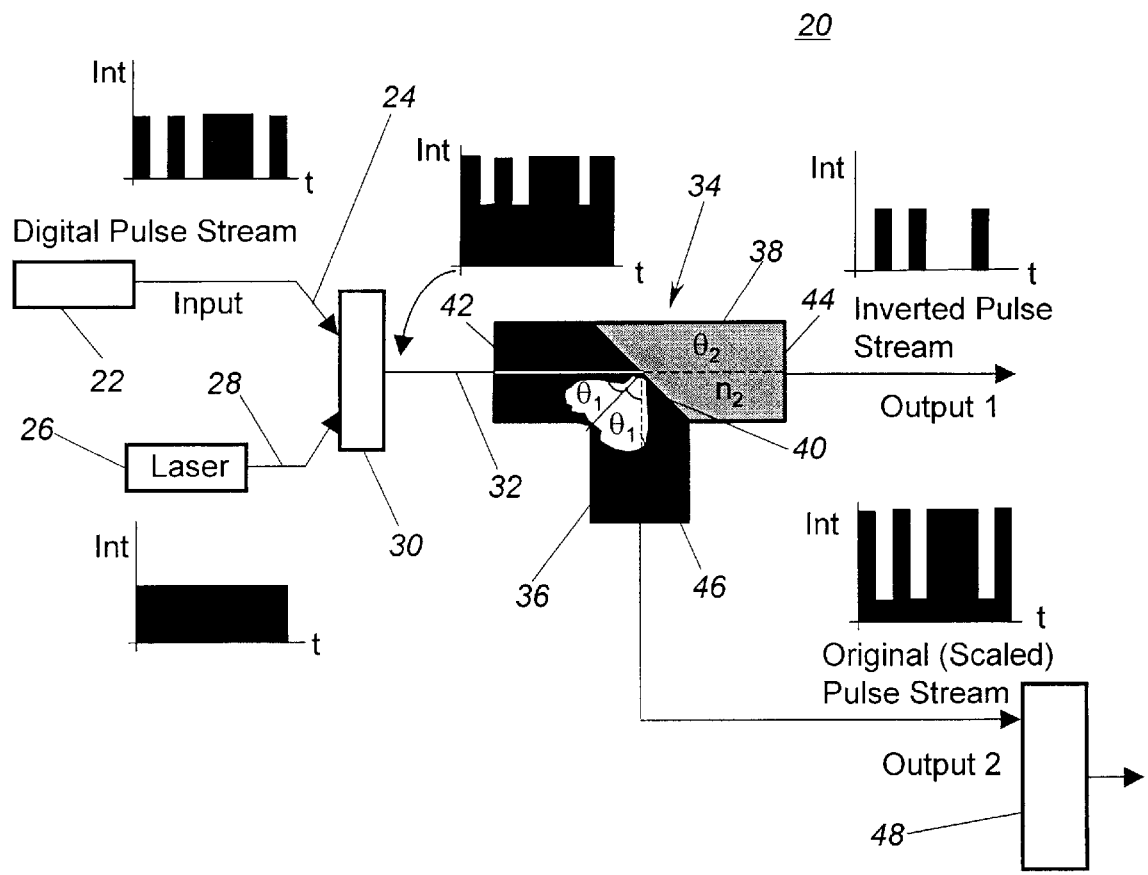
FIG. 2 is a schematic block diagram of an optical inverter employing an intensity dependent switch having a variable refractive index material at an optical interface, according to an embodiment of the present invention.

FIG. 2 is a schematic block diagram showing the architecture of an optical inverter 20, according to an embodiment of the present invention. An optical digital input source 22 generates an optical digital pulse input beam that propagates down a suitable optical waveguide 24, such as a fiber optical cable or a semiconductor waveguide. Additionally, a laser 26 generates a laser beam that propagates down an optical waveguide 28. The digital input source 22 and the laser 26 can be any suitable optical source for the purposes described herein, such as a semiconductor laser, that generates an applicable optical beam having a certain beam intensity and wavelength depending on the particular application for the inverter 20. The optical input beam on the waveguide 24 is shown as an optical digital pulse beam by intensity (Int) relative to time t, and the laser beam on the waveguide 28 is shown as a continuous beam. The pulsed beam and the continuous beam are combined in an optical combiner 30 to get a combination continuous and pulsed beam propagating on a waveguide 32, as shown. The continuous laser beam causes the digital pulse beam to be level shifted up. The optical combiner 30 can be any suitable optical coupler known in the art, such as a fiberoptic 3 dB coupler or a semiconductor waveguide combiner.

The combined optical beam is then sent to an intensity dependent optical inverting switch 34 that includes a first optical structure 36 having a variable index of refraction of $n_1(I)$ and a second optical structure 38 having a substantially constant index of refraction $n_2$. An interface 40 is defined between the structures 36 and 38. The index of refraction $n_1(I)$ of the first optical structure 36 is variable in relation to the intensity of the combined beam on the waveguide 32. For example, as the intensity of the combined beam goes up, the index of refraction of the optical structure 36 increases and vice versa. When no beam is applied to the structure 36, its index of refraction is some minimum value $n_{1,0}$. The index of refraction $n_2$ of the second optical structure 38 remains substantially constant regardless of the intensity of the combined beam. Also, the index of refraction $n_1(I)$ will be greater than the maximum index of refraction $n_2$.

The interface 40 is a high grade optical interface that allows light propagation, where the optical structure 36 and 38 are adhered together by a suitable high quality optical glue or the like. The optical structures 36 and 38 can be made of any suitable optical material that satisfies the properties as described herein. For example, the first optical structure 36 can be lithium niobate or a suitable optical semiconductor material. The combined beam is received by the switch 34 at an input port 42 of the first optical structure 36. As will be described in detail below, the switch 34 provides a first output at an output port 44 of the second optical structure 38 that is the optical inversion of the digital pulsed stream on the waveguide 24, and a second output at an output port 46 of the first optical structure 36 that is the same as the original pulse stream on the waveguide 24 scaled and level shifted by a certain magnitude that is less than the magnitude of the laser beam. The switch 34 has a general T-shaped configuration in one design, as shown.

The inverting switch 34 operates by the optical principal known as total internal reflection. The amount of light that passes through the interface 40 from the first structure 36 to the second structure 38 is dependent on the relative indexes of refraction of the materials of the structures 36 and 38, and the angle of incidence $\theta_1$ at which the combined beam strikes the interface 40. The angle of incidence $\theta_1$ is determined by the direction of propagation of the combined beam through the first optical structure 36 and a line perpendicular to the interface 40, as shown.

The refractive index $n_1(I)$ of the first structure 36 varies with the intensity of light passing through it. In general, the material of the first structure 36 would have a higher index of refraction for higher intensities than for lower intensities as:

$$n_1(I) = n_{1,0} + \Delta n(I) \qquad 1$$

where $n_{1,0}$ equals the nominal index of refraction (no light) of the structure 36 and $\Delta n(I)$ represents its intensity dependence. The switch 34 is oriented relative to the propagation direction of the combined beam in such a way that light from the input port 42 strikes the interface 40 at the predetermined angle of incidence $\theta_1$, as shown. The switch 34 operates according to the invention by taking advantage of the critical angle $\theta_c$ of reflection at the interface 40, which changes as the ratio of the refractive indexes between the structures 36 and 38 changes. The critical angle $\theta_c$ is derived from Snell's Law as:

$$\theta_c = \sin^{-1} \frac{n_2}{n_1(I)} \qquad 2$$

Because the index of refraction $n_1(I)$ changes with the intensity of the combined beam, the critical angle $\theta_c$ will change accordingly. If the combined beam has a low intensity, then the index of refraction $n_1(I)$ is low, and the critical angle $\theta_c = \theta_{c,low}$ is large. If the value of $\theta_{c,low}$ is larger than the angle of incidence $\theta_1$, most of the combined beam will be transmitted through the interface 40 and refracted by the second structure 38 at a certain angle of refraction $\theta_2$, and appear at the first output port 44. A small portion of the beam will be reflected to the port 46. If the input intensity is large, then the index of refraction $n_1(I)$ also becomes large, and the critical angle $\theta_c = \theta_{C,high}$ becomes small. If $\theta_{C,high}$ is smaller than $\theta_1$, then the light will experience total internal reflection and will be passed down to the output port 46, at the angle of reflection $\theta_r$, as shown. The selection of the angle of incidence $\theta_1$ is critical for operation of the inverter 20. Particularly, $\theta_1$ must be such that it is greater than the critical angle $\theta_c$ for a high intensity input, but less than the critical angle $\theta_c$ for a low intensity input. That is, $\theta_{C,high} < \theta_1 < \theta_{C,low}$.

The inverter 20 operates as follows. The optical digital beam is combined with the output of the laser 26. The resulting optical signal is composed of pulses having high and low levels which are level-shifted versions of the digital input beam. This combined pulse beam enters the inverting switch 34, and sees a refractive index of $n_1(I)$. At a given time, if the input pulse of the pulse beam is high, the refractive index $n_1(I)$ of the structure 36 becomes large, and the critical angle $\theta_c$ at the interface 40 becomes $\theta_{C,high}$. In this case, the angle of incidence $\theta_1$ is larger than $\theta_{C,high}$, and the light beam is entirely reflected by the interface 40 back into the first structure 36. The first output at the port 44 is then dark or "low" and the second output at the port 46 is bright or "high." If the intensity of the input of the pulse beam is low, the refractive index $n_1(I)$ of the structure 36 becomes small, and the critical angle $\theta_c$ at the interface 40 becomes $_{C,low}$. In this case, the angle of incidence $\theta_1$ is less than $\theta_{C,low}$, and the light is mostly transmitted through the interface 40 to the second structure 38 and partially reflected by the interface 40 back into the first structure 36. The first output at the port 44 is then bright or "high" and the second output at the port 46 is dark or "low."

The inverter 20 therefore produces an inverted pulse beam at the first output port 44 and an intensity shifted version of the input at the second output port 46. If desirable, the digital stream on the second output can be "cleaned up" using a thresholding device 48, such as a saturable absorber, to eliminate the residual reflected or scaled light in the low state. The angle of incidence $\theta_1$ is designed so that the threshold intensity where the combined beam goes from refraction to reflection is about half-way between the intensity of the laser beam and the intensity of the laser beam plus a positive pulse of the pulse beam.

The distance of the output path from the interface 40 to the output port 44 for the first output and the distance of the output path from the interface 40 to the output port 46 for the second output may be important in certain applications if both the inversion output and the complementary output are used. Also, since the combined beam travelling on the waveguide 32 adds optical intensities, it may be desirable to make the digital pulse stream input and the laser beam non-coherent, or make the laser beam generally broadband, so the phase relationship between the digital pulse stream and the laser beam do not destructively combine.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical system for inverting a digital optical beam, said system comprising:
   a continuous beam source generating a continuous beam;
   an optical beam combiner receiving and combining the digital optical beam and the continuous beam into a combined beam; and
   an optical inverting device responsive to the combined beam, said inverting device including a first optical structure and a second optical structure being made of different optical materials and forming an interface therebetween, said first optical structure receiving the combined beam and having a index of refraction that is variable and dependent on the intensity of the combined beam, said combined beam being caused to impinge the interface at a predetermined angle of incidence, wherein most of the combined beam is refracted through the interface into the second optical structure if a critical angle defined by the index of refraction of the first optical structure and the index of refraction of the second optical structure is greater than the angle of incidence, and wherein the refracted combined beam exits the second optical structure as an inversion of the digital optical beam.

2. The system according to claim 1 wherein the combined beam is reflected off of the interface and exits the first optical structure as a scaled version of the digital optical beam that includes a replica of the digital optical beam and a portion of the continuous beam if the critical angle is less than the angle of incidence.

3. The system according to claim 2 further comprising an optical thresholding device that is responsive to the reflected combined beam exiting the first optical structure, said optical thresholding device removing the portion of the continuous beam to generate the replica of the digital pulse beam.

4. The system according to claim 3 wherein the optical thresholding device is a saturable absorber.

5. The system according to claim 2 wherein the distance between the interface and the location where the inverted beam exits the second optical structure is about the same as the distance between the interface and the location where the scaled beam exits the first optical structure.

6. The system according to claim 1 wherein the first and second optical structures are combined as a single optical unit being made of optical materials.

7. The system according to claim 6 wherein the single optical unit has a general T-shape configuration.

8. The system according to claim 1 wherein the continuous beam source is a laser beam source generating a laser beam.

9. The system according to claim 1 wherein the index of refraction of the second optical structure is substantially constant and is less than the variable index of refraction of the first optical structure.

10. An optical system for inverting an optical signal, said system comprising:
    a digital optical source generating a digital optical pulse beam;
    a laser beam source generating a laser beam;
    an optical beam combiner receiving and combining the digital pulse beam and the laser beam into a combined beam; and
    an optical inverting device responsive to the combined beam, said inverting device including a first optical structure and a second optical structure forming an interface therebetween, said first optical structure having a variable index of refraction relative to the intensity of light propagating therethrough and said second optical structure having a substantially constant index of refraction, wherein the variable index of refraction of the first structure and the constant index of refraction of the second structure define a critical angle by Snell's Law at the interface, said combined beam being directed into the first optical structure to impinge the interface at a predetermined angle of incidence, wherein most of the combined beam is refracted through the interface into the second optical structure and a portion of the combined beam is reflected off of the interface if the critical angle is greater than the angle of incidence, said refracted beam exiting the second optical structure at a first optical port as an inversion of the digital optical beam and the reflected portion of the combined beam exiting the first optical structure at a second optical port, and wherein the combined beam is completely reflected off of the interface and exits the first optical structure at the second optical port as a scaled version of the digital pulse beam if the critical angle is less than the angle of incidence.

11. The system according to claim 10 further comprising an optical thresholding device that is responsive to the reflected beam exiting the first optical structure, said optical thresholding device removing a portion of the reflected beam to generate a replica of the digital pulse beam.

12. The system according to claim 11 wherein the optical thresholding device is a saturable absorber.

13. The system according to claim 10 wherein the distance between the interface and the first optical port is about the same as the distance between the interface and the second optical port.

14. The system according to claim 10 wherein the first and second optical structures are combined as a single optical unit having a general T-shape configuration.

15. A method of inverting an optical digital pulse beam, said method comprising the steps of:

generating a laser beam;

combining the pulse beam with the laser beam into a combined beam;

directing the combined beam onto an interface between a first optical structure and a second optical structure at a predetermined angle of incidence, said first optical structure having an index of refraction that is variable with the intensity of the combined beam; and refracting the combined beam through the interface into the second optical structure if a critical angle defined by the relationship between the index of refraction of the first optical structure and the index of refraction of the second optical structure is greater than the angle of incidence, wherein the refracted beam exits the second optical structure as an inversion of the digital pulse beam.

16. The method according to claim 15 further comprising the step of reflecting the combined beam off of the interface if the critical angle is less than the angle of incidence, said reflected beam exiting the first optical structure.

17. The method according to claim 16 wherein the step of refracting the combined beam includes reflecting a portion of the combined beam off of the interface to exit the first optical structure, and wherein the beam exiting the first optical structure is a scaled version of the combined beam.

18. The method according to claim 17 further comprising the step of filtering the reflected beam to remove a portion of the beam to generate a replica of the pulse beam.

19. The method according to claim 18 wherein the step of filtering the reflected beam includes using a saturable absorber.

* * * * *